July 31, 1923.
A. M. BATES
1,463,770
RECORDING SCALE
Filed Oct. 24, 1921 3 Sheets-Sheet 1
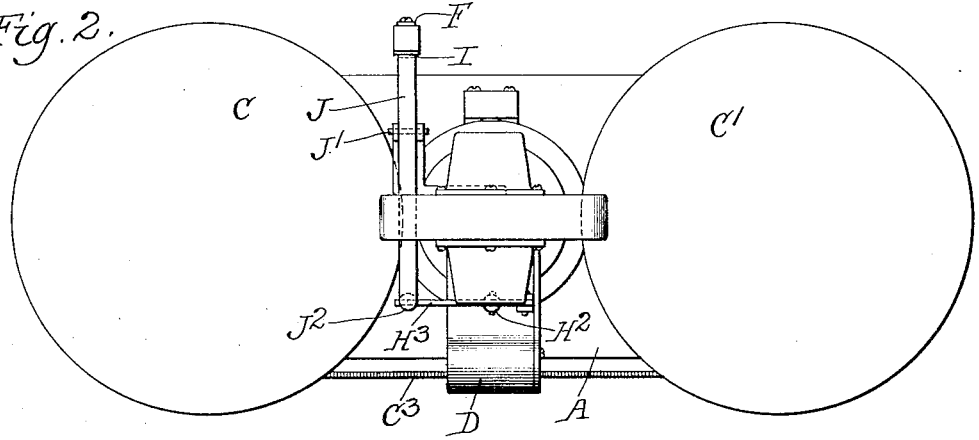
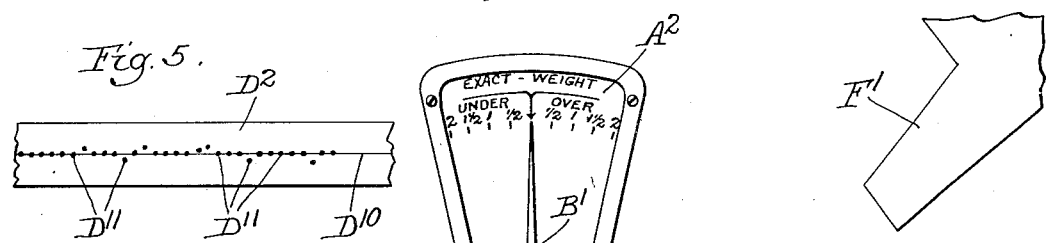
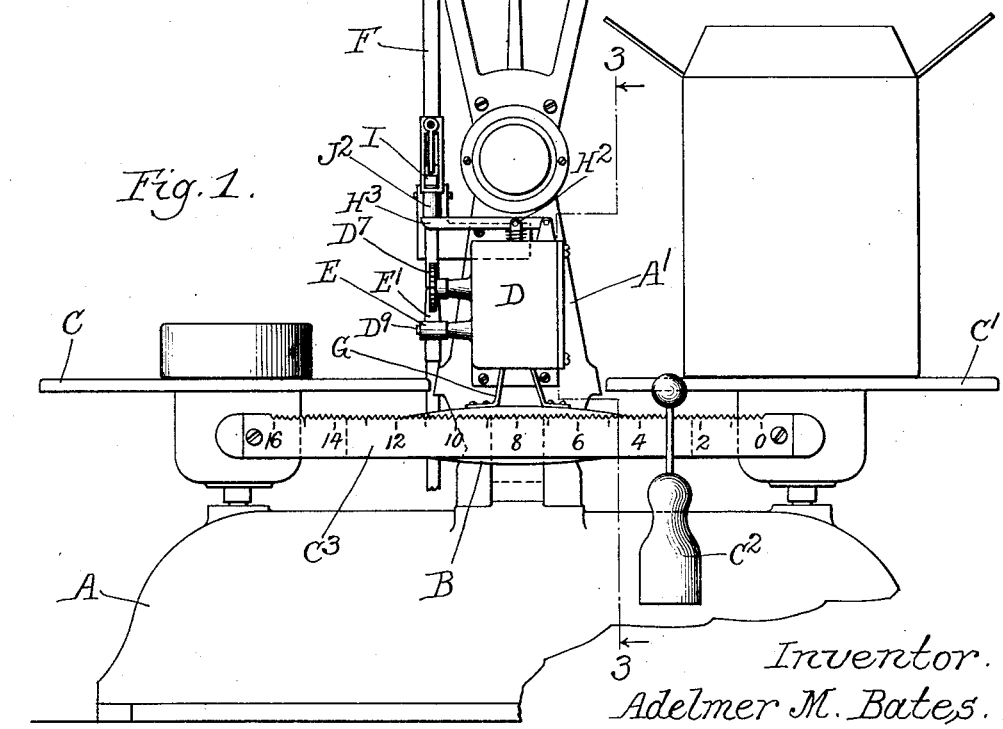

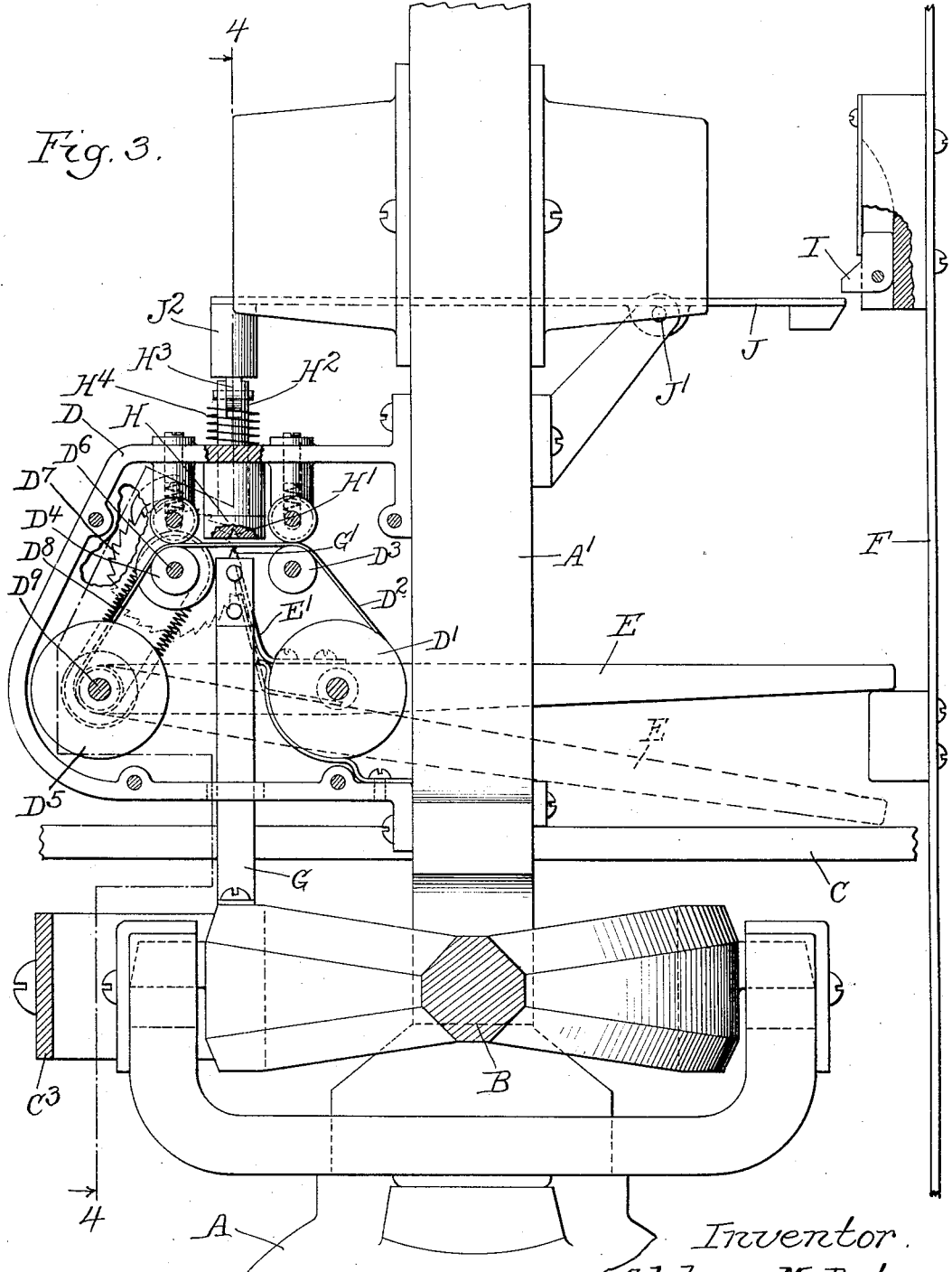

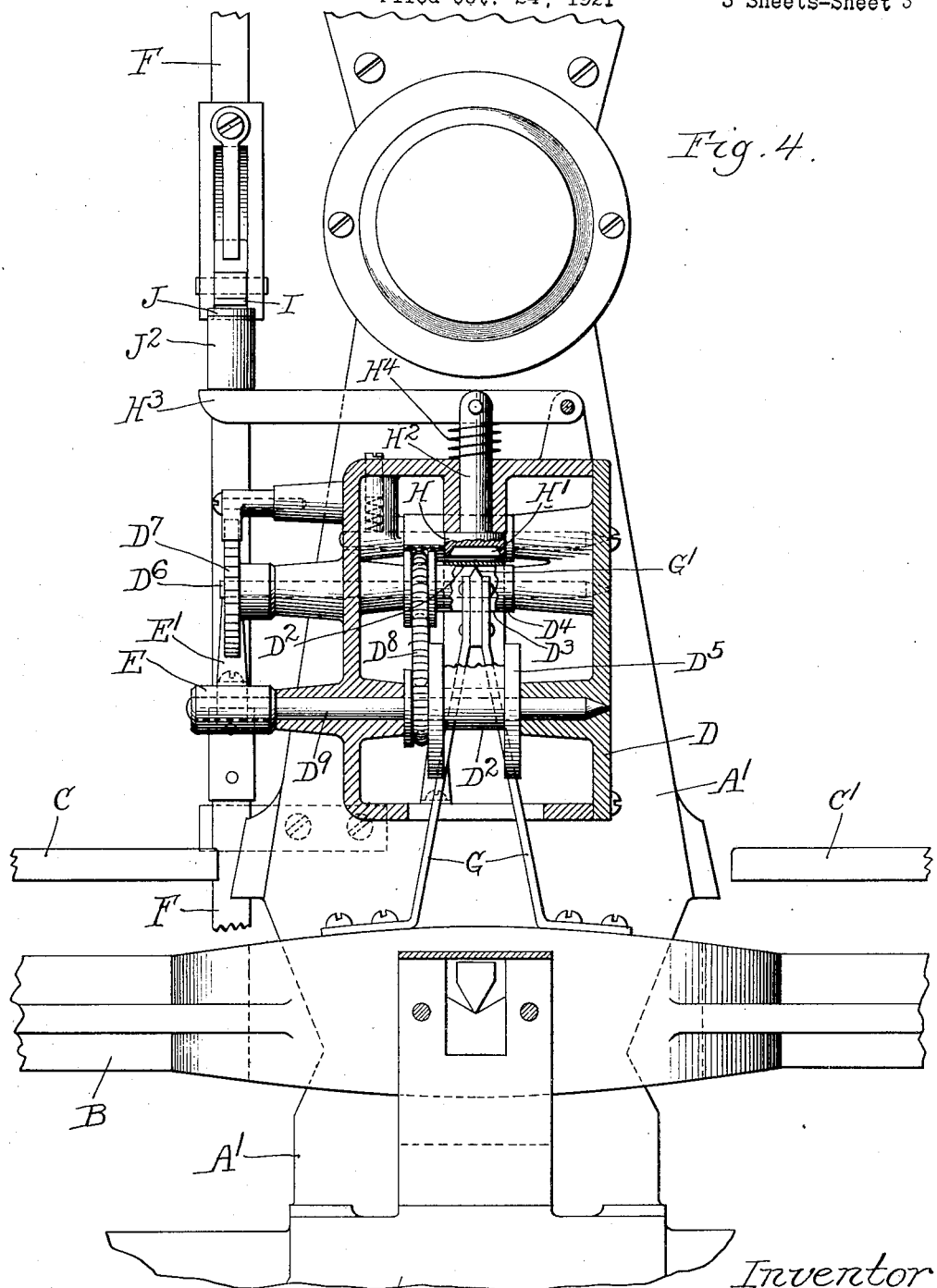

Patented July 31, 1923.

1,463,770

UNITED STATES PATENT OFFICE.

ADELMER M. BATES, OF CHICAGO, ILLINOIS.

RECORDING SCALE.

Application filed October 24, 1921. Serial No. 509,943.

*To all whom it may concern:*

Be it known that I, ADELMER M. BATES, a citizen of the United States, residing at Chicago, in the county of Cook and State of Illinois, have invented a certain new and useful Improvement in Recording Scales, of which the following is a specification.

This invention relates to a recording scale, and is particularly adapted for use in connection with a scale which is adapted to be used in filling packages each of which is to be filled until its contents equals a predetermined weight. My recording device is designed to record the variation of the filled package from the predetermined weight. Other objects will appear from time to time throughout the specification and claims.

My invention is illustrated more or less diagrammatically in the accompanying drawings, wherein—

Figure 1 is a front elevation of the scale with my recording device in position;

Fig. 2 is a plan view of the same;

Fig. 3 is a cross section on an enlarged scale taken on line 3—3 of Fig. 1;

Fig. 4 is a cross section taken on line 4—4 of Fig. 3.

Fig. 5 illustrates the recording strip.

Like parts are indicated by like characters throughout.

A is a scale base upon which is mounted the upwardly extending housing $A'$, which terminates at its upper end in the weight indicator card $A^2$.

B is a scale beam adapted to oscillate with variations in the weight placed upon the scale. $B'$ is an indicator arm adapted to move with the oscillation of the scale beam B and to indicate the weight on the indicator card $A^2$.

C is the left scale pan upon which a weight may be placed. $C'$ is a right hand pan upon which the package is preferably put. The package may be placed directly upon the scale pan or it may be placed upon a raised supporting member which is itself attached to the scale pan. This is not shown, as it is not necessary and forms no part of the present invention. $C^2$ is a traveling weight which may be placed in position upon the scale bar $C^3$.

Fastened to the member $A'$ is the recorder mechanism housing D. Within this housing is a supply roller $D'$, upon which a roll of paper tape $D^2$ is mounted. This tape is passed over the supporting rollers $D^3$ and $D^4$ and wound about the feed roller $D^5$. Upon the shaft $D^6$ which carries the supporting roller $D^4$, is mounted the driving ratchet $D^7$. By means of this ratchet rotation is imparted to the shaft $D^6$, and the feed shaft $D^9$, upon which the feed roller $D^5$ is mounted, is rotated through the flexible belt $D^8$. Thus, in response to the rotation of the ratchet $D^7$ the strip of paper is taken off of the roll $D^1$ and finally wound upon the roll $D^5$.

Pivoted at one end upon the shaft $D^9$, and free to rotate with relation to it, is the lever E. Upon this lever is the spring pawl $E'$. This pawl engages the ratchet wheel $D^7$ and in response to the up and down movement of the lever E rotates it in a step by step movement and so advances the strip of paper. The lever E is raised and lowered in response to the vertical reciprocation of the rod F, which may or may not be reciprocated automatically. It is preferably reciprocated in response to the operation of the supply control which feeds the material to the package that is being filled through the spout $F^1$. When the rod F is in the position shown in Figure 3, the lever E is raised and the pawl $E'$ is in contact with the ratchet wheel $D^7$. When the rod F is lowered, the lever E is in the position shown in dotted lines, and in coming to that position the pawl $E'$ slides over the teeth of the ratchet wheel $D^7$.

Mounted upon the scale beam B so as to move with it is the anvil G, which terminates at its upper end in the point $G'$. This point is immediately below the strip of paper $D^2$ and normally out of contact with it.

In opposition to the anvil point $G'$ is the hammer head H, which is recessed as at $H'$. This hammer head is carried on the hammer shaft $H^2$, which in turn is pivoted upon the lever $H^3$, which is pivoted at one end upon the housing D. The hammer head is normally held out of contact with the strip of paper by means of the helical spring $H^4$. Periodically, however, the hammer head is forced down and carries the strip of paper against the anvil so that the strip is perforated. This movement of the hammer head is caused by the reciprocation of the rod F. As the rod descends the pivoted stop I contacts the weighted end of the lever arm J, which is pivoted at J' on the member A'. This lever arm J' carries in the other end a weighted head J². As the lever arm is depressed by the pivoted stop I, the weighted end J² is raised. When the depressed end of the lever arm J is released by the continued movement of the stop I, the head J² falls, striking the lever H³, depressing the hammer head, in opposition to the spring H⁴, and perforating the strip of paper. In the center of the paper tape D² is an indicating line D¹⁰. D¹¹ are marks made on or in the indicating tape, each one indicating a single weighing.

Although I have shown an operative mechanism, still it will be obvious that many changes in form, shape and relation of parts may be made without departing materially from the spirit of my invention, and I wish therefore that my showing be taken as in a sense diagrammatical. In particular, while I have shown the record strip as being perforated, it will be obvious that it might merely be marked, and I therefore do not wish to be limited to any construction in which the strip is perforated.

The use and operation of my invention are as follows:

As indicated in Figure 1, the indicator arm points to the center of the indicator card when the scale is balanced. The scale is set up to balance when a given amount of material has been allowed to run into the package. This weight may be controlled on the scale bar by the movement of the traveling weight, or may be controlled by a weight placed upon the scale pan. Whenever this weight is balanced, it will be obvious that a quantity of material equal to the weight has run into the package. This arrangement is advisable as it calls for no calculation of the weight on the part of the scale operator.

The vertical rod is reciprocated once with each weighing operation, and in its upward reciprocation, through the lever E, it rotates the paper strip feed mechanism so that with each weighing operation a new portion of the paper strip is brought between the anvil and the hammer head. With each downward reciprocation of the rod the lever J is rotated and the weighted head of that lever is caused to strike the lever carrying the hammer head and so the paper is perforated. This perforating movement takes place at the time when the package has been filled. I prefer to have a line running through the center of the recording paper strip. If the scale is properly balanced at the time that the perforation of the paper takes place, the perforation should fall directly upon the line in the center of the strip of paper. If, however, the scale is somewhat out of balance, the perforation will be either to the right or left of that line, indicating respectively either over or under weight. There may be other lines on each side, to show the degree of variation. Thus by means of my mechanism an exact record is made of the weight of each package, and this record will show positively whether any particular weight was over or under the predetermined weight.

In the form shown herewith the operation of the recording mechanism is controlled by the operation of the feed mechanism as follows: The material which is fed into the bags or packages is in a bin or other storage receptacle above the scale. Discharge of this material into the package is controlled by the operator by means of the vertical rod F. When discharge is to commence, the rod is raised, thus opening the discharge valve and permitting the material to be discharged into the package which is on the scale. This raising of the rod moves forward the recording strip one step. When it is necessary to shut off the discharge of the material, the rod is lowered, thus closing the discharge valve. During the lowering of the rod the lever J is contacted by the stop I on the rod and its outer end is depressed and its other end is raised. As the downward movement of the rod is continued, the lever trips off of the stop I and thus its inner weighted end descends and through the second lever depresses the hammer head and so forces the paper against the anvil and either marks or perforates it so as to indicate the weight of the package. By this means the discharge of the material into the package is stopped slightly before the mark recording the weight of the package and contents is made, and thus the final weight of the package is recorded without question. Although the anvil as shown is adapted to perforate the recording strip, it might of course merely mark it, and any means for marking the strip might be substituted without departing from the spirit of my invention.

While I have shown the recording mechanism as operated by the material, and while I prefer to have it so operated, it could of course be operated in any suitable manner, and I do not wish to be limited to the manner shown.

I claim:

1. In combination with a scale, means for recording each weighing, comprising a record strip and means for marking said strip once during each weighing, said recording means being adapted to indicate the variation of the weight weighed from a pre-determined norm by the variation in the location of the recording mark from a predetermined norm.

2. In combination with a scale, means for recording each weighing, comprising a record strip, and means for perforating said strip once during each weighing, said recording means being adapted to indicate the variation of the weight weighed from a predetermined norm by the variation in the location of the recording perforation from a predetermined norm.

3. The combination with a scale adapted to be set to balance at a predetermined weight, of recording mechanism associated therewith and adapted to indicate the variation from the balance position, means for feeding material to the scale and for cutting off the flow thereof, and automatic means operative only after the flow of material is stopped for operating the recording mechanism.

4. In combination with a scale, means for recording each weighing, comprising a record strip having disposed therealong a mark indicating the normal weight of each unit weighed, and means for marking said strip once during each weighing, adapted to leave, by the relative position of said mark and said normal weight indication, a permanent record of the variation of the weight of each unit weighed from the predetermined norm.

5. In combination with a scale having a beam, a recording mechanism adapted to record each weighing, comprising an anvil fixed upon the beam adjacent its point of balance, a hammer aligned therewith, and a recording strip adapted to be drawn between said hammer and said anvil, and means for bringing said hammer and anvil together to mark said strip.

6. In combination with a scale having a beam, a recording mechanism adapted to record each weighing, comprising an anvil fixed upon the beam adjacent its point of balance, a hammer aligned therewith, and a recording strip adapted to be drawn between said hammer and said anvil, means for forcing the hammer against the anvil to mark the strip, and means normally holding the hammer out of contact with anvil and strip.

7. In combination with a scale having a beam, a recording mechanism adapted to record each weighing, comprising an anvil fixed upon the beam adjacent its point of balance, a hammer aligned therewith, and a recording strip adapted to be drawn between said hammer and said anvil, means for bringing said hammer and anvil together to mark said strip, and yielding means adapted normally to separate the hammer and anvil.

8. In combination with a scale having a beam, a recording mechanism adapted to record each weighing, comprising a member fixed upon the beam, an opposed member aligned therewith, a recording strip adapted to be drawn between said members, a marking element mounted upon one of said members, and means for bringing said members together to mark said strip, said strip being adapted to indicate by the location of said mark upon the strip the relation of each unit weighted to the desired norm or weight.

9. In combination with a scale having a beam, a recording mechanism adapted to record each weighing, comprising a member fixed upon the beam adjacent its point of balance, an opposed member aligned therewith, a recording strip adapted to be drawn between said members, a marking element mounted upon one of said members, and means for bringing said members together to mark said strip.

10. In combination with a scale, means for recording each weighing, comprising a record element, and means for marking said element in response to each weighing, said means adapted to vary the location of said mark on the element in response to variations of the weight weighed.

11. In a recording scale, a package weighing mechanism, means for feeding the material to be weighed, a recording mechanism adapted to record the weight of each package weighed in terms of variation from a predetermined worm, and unit means for successively cutting off the feed of material and for operating the recording mechanism.

12. In a weight recording device, a record strip and means to mark said strip in response to weighings on said device, said means being adapted to vary the location of the marks transversely of the strip in response to variations of the weights weighed.

13. In a weight recording device, marking means movable in response to the weight of a charge weighed on said device, a record strip positioned transversely of the direction of movement of the marking means and having a longitudinal mark thereon in position to receive the impression of said marking means when a predetermined weight is weighed on said device, and means for impressing said marking means on said strip in response to each weighing.

14. In a weight recording device, a record strip, a punch movable transversely of said strip in response to a weight being weighed by said device, and a hammer adapted to press the strip against the punch and having in its face a groove adapted to receive the end of the punch in whatever position the punch may be transversely of the strip.

15. In combination with a scale having a pivoted beam, a recording mechanism adapted to record a plurality of weighings, comprising an anvil fixed on the beam, a hammer aligned therewith, and means for positioning a record strip between said anvil and hammer and parallel with the axis about which the beam moves, 16. In combination with a scale having a pivoted beam, a recording mechanism comprising an anvil fixed on the beam, a hammer aligned therewith, and means for positioning a record strip between said anvil and hammer and moving it between successive blows of the hammer in a direction parallel with the axis about which the beam moves.

Signed at Chicago, county of Cook and State of Illinois, this 30th day of September, 1921.

ADELMER M. BATES.